Dec. 4, 1951          A. L. GAIPTMAN          2,577,458

APPARATUS FOR REGULATING AIR PRESSURE IN AUTOMOBILE TIRES

Filed Oct. 24, 1947          2 SHEETS—SHEET 1

INVENTOR
ARNOLD L. GAIPTMAN,
BY
*Irving Seidman*
ATTORNEY

Dec. 4, 1951  A. L. GAIPTMAN  2,577,458
APPARATUS FOR REGULATING AIR PRESSURE IN AUTOMOBILE TIRES
Filed Oct. 24, 1947  2 SHEETS—SHEET 2
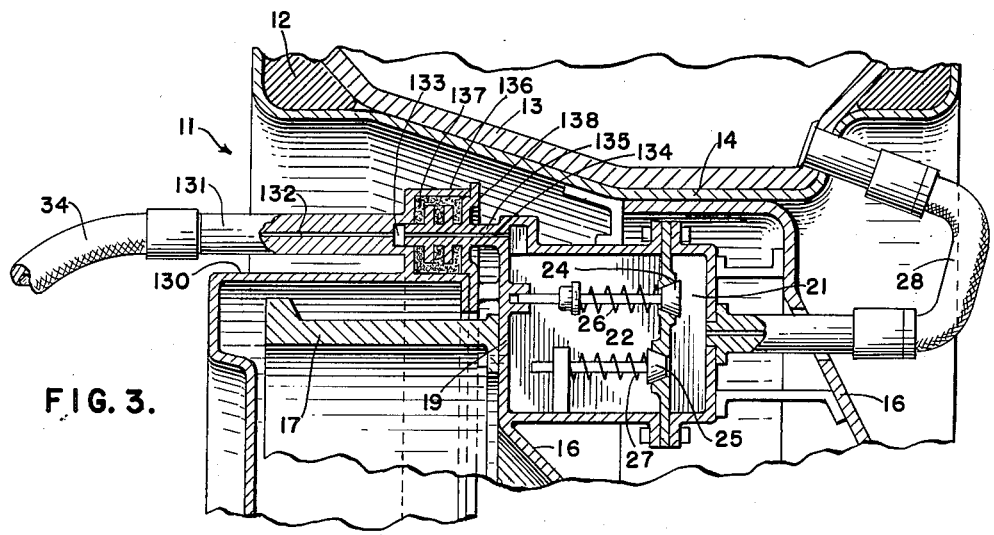
FIG. 3.
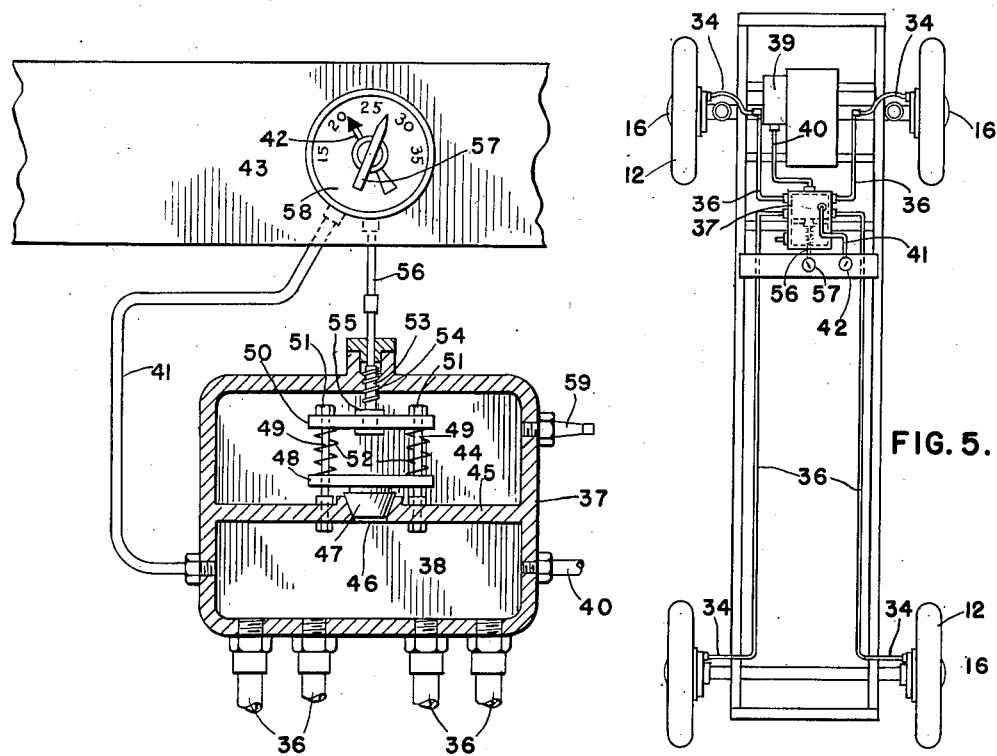
FIG. 4.
FIG. 5.
INVENTOR.
ARNOLD L. GAIPTMAN,
BY
ATTORNEY

Patented Dec. 4, 1951

2,577,458

UNITED STATES PATENT OFFICE 2,577,458

APPARATUS FOR REGULATING AIR PRESSURE IN AUTOMOBILE TIRES

Arnold L. Gaiptman, New York, N. Y.

Application October 24, 1947, Serial No. 781,894

1 Claim. (Cl. 152—416)

This invention relates to means for automatically maintaining a predetermined pressure in automobile tires while the vehicle is in motion or at a standstill but with the engine idling.

In my invention, the pneumatic tubes within the tires are tubularly connected with a control valve compartment, which in turn is supplied with air from a compressor operated by the engine of the automobile.

An object of my invention is to provide a tire-inflating and air-controlling means which has pneumatic connection with all the tires of an automobile, and with an indicator and controlling means located upon the instrument board of the automobile.

Another object of my invention is the inclusion therein of an indicator upon the instrument board of an automobile to set the tire inflation to any desired pressure.

A further object of my invention is the inclusion therein of an automatically operated series of valves to keep the inflated tires to the pressure set by the control unit on the instrument board of an automobile.

A still further object of my invention is the inclusion therein of a swivel connecting means between the chassis and wheels of an automobile to permit the flow of air to and from the wheels.

A still further object of this invention is the provision of an organization in which the constituent elements are so arranged structurally and functionally as to assure improved results with materials and members which may be manufactured at reasonable cost, may be easily assembled, and which will be efficient in operation with minimum wear to the parts.

My invention possesses other objects and features of advantage some of which, with the foregoing, will be set forth in the following description and in the claim wherein parts will be identified by specific names for convenience, but they are intended to be as generic in their application to similar parts as the art will permit. In the accompanying drawings, there has been illustrated the best embodiment of the invention known to me, but such embodiment is to be regarded as typical only of many possible embodiments, and the invention is not to be limited thereto.

The novel features considered characteristic of my invention are set forth with particularity in the appended claim. The invention, itself, however, both as to its organization and its method of operation, together with additional objects and advantages thereof, will best be understood from the following description of a specific embodiment when read in connection with the accompanying drawings, in which:

Figure 3 is a fragmentary section view, showing a modified form of a swivel connection at the wheel hub.

Figure 4 is a fragmentary view, showing a portion of the instrument board in full view, and an air compartment in section.

Figure 5 is a diagrammatic view, in plan, showing a chassis and the tubular connections to the parts.

Figure 1:
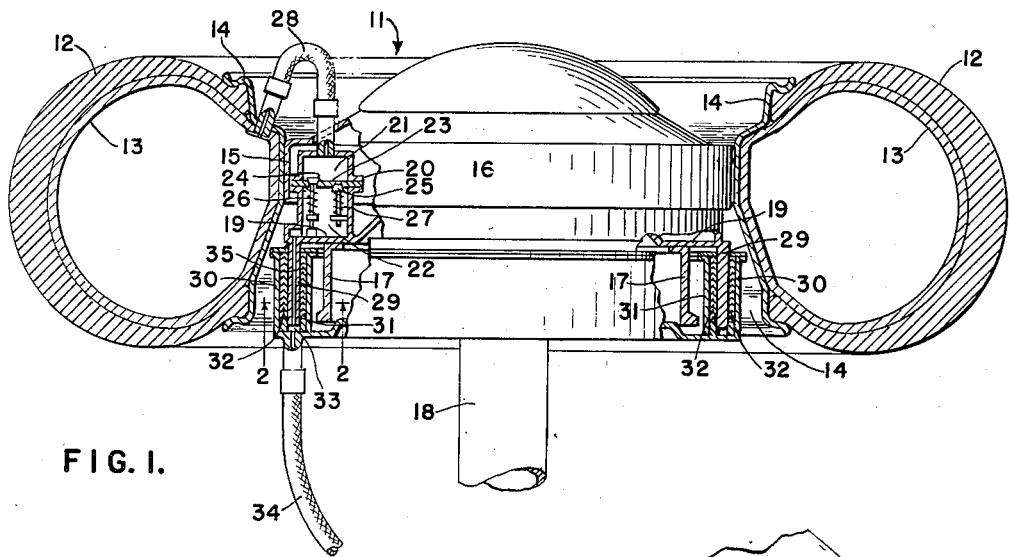
Figure 1 is a sectional view through an automobile wheel approximately at the hub and brake drum, and shows parts in section.
Figure 2:
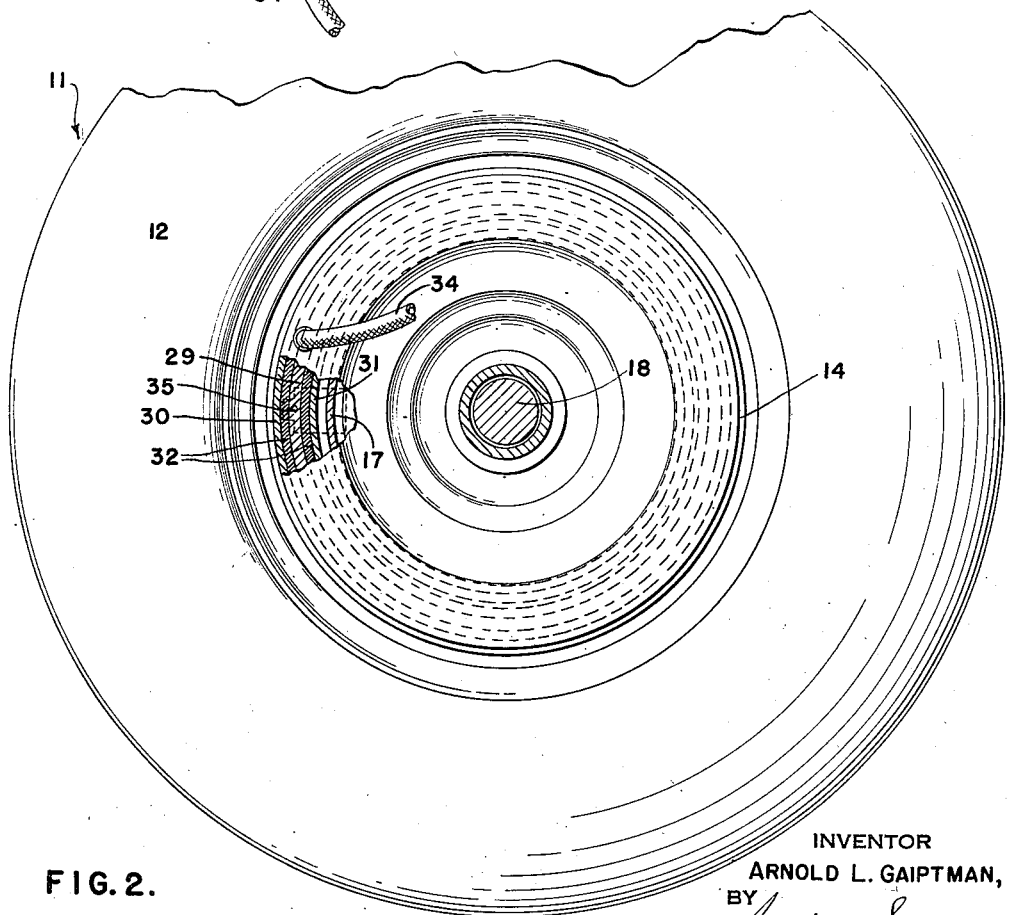
Figure 2 is a side elevational view, partly broken away at the line 2—2 of Figure 1, of an automobile wheel showing the swivel connecting means for supplying air to the inner tube.

Referring in detail to the parts, 11 designates an automobile wheel carrying an outer shoe 12, and an inner tube 13, which are attached in the usual way to the rim 14. Securely attached to the rim at 15, there is a hub 16, having the usual brake drum 17, integrally attached thereto, the whole being rotative with the wheel upon the axle 18, which is, in turn, secured to the chassis in the usual manner. The drum 17, is suitably secured to a flat, annular member 19, which forms the inner wall of the hub 16, and to which there is attached, in any suitable manner, a valve chamber 20, having an outer air compartment 21, and an inner air compartment 22, separated by a dividing partition 23. The said dividing partition 23, has an air inlet valve 24, and an air pressure control valve 25, both valves having spring adjustment means 26 and 27 respectively. The air compartment 21, is connected with the inner tube 13, through the flexible tube 28, and the valve 24, is adapted to lock the air in the inner tube regardless of the air pressure therein.

Extending from, and attached to the aforesaid flat annular member 19, is a cylindrically shaped member 29, which is adapted to move between the walls 30 and 31, immovably fixed upon the chassis.

The said walls 30 and 31, are cylindrically shaped and form a channel or passage within which the said member 29, moves while it rotates with the turning wheel and, with the packing 32, form an air seal between the stationary and rotating parts. An annular air channel 33, is provided, into which air is directed from the flexible tube connection 34, and a channel 35, in the said member 29, provides an air inlet into the air compartment 22, from the annular air channel 33.

The flexible tube connection 34, from each wheel is connected with the lines 36, which lead to an air distributor and control box 37, and enter a distributor compartment 38, formed in the air distributor box 37, which receives air from a compressor 39, through a tube 40. A tube 41, connects with a pressure gauge 42, upon the instrument board 43, and indicates the pressure of the air in the tires.

A pressure control compartment 44, is provided in the box 37, and is separated from the first mentioned distributor compartment 38, by a partition 45, having an opening 46, in which a valve 47, is seated and held within the opening by a crossbar 48, slidable upon rods 49, which are fixed upon the partition 45. Slidably mounted upon the upper ends of the said rods 49, is a second crossbar 50, the upward movement of which is limited by the nut heads 51. Springs 52, engage around the said rods 49, between the crossbars 48 and 50. The pressure of the said springs against the crossbar 48, will hold the valve 47, upon its seat, and this pressure may be varied by adjusting the cross bar 50, to shorten the distance between the two said crossbars and increase the pressure of the springs.

This increase in pressure is accomplished by means of a threaded bar 53, engaging in corresponding threads at 54, in the wall of the box 37, and having a swivel connection at 55, with the said cross bar 50. The said bar 53, is attached to a flexible cable connection 56. The turning of the flexible cable 56, and its connected threaded bar 53, will move the said cross bar 50, against the pressure of the spring 52, thereby increasing the spring pressure upon the valve 47. The said flexible cable is also connected with a manipulating knob 57, turnable upon a dial 58, on the instrument board 43. The position of the cross bar 50, with respect to the cross bar 48, will determine the pressure of the springs 52 which, in turn, will transmit their pressure to the valve 47. The said pressure is measured by pounds as indicated by the numerals upon the dial 58.

Figure 3 illustrates a modified form of packing and air sealing means between the stationary member upon the chassis of the car and the rotating member upon the wheels.

The said modified form shows the stationary member designated by the numeral 130, and has formed thereon a stem 131, which has a channel 132, and which provides a means for connecting the tube 34. The inner end of the channel 132, opens into a broadened section 133, from which air flows through an air passage 134, which is formed in a fin-shaped annular flange member 135. The said fin-shaped annular flange 135, moves in a circular box formation 136, formed upon the said stationary member 130, and is imbedded in any suitable packing element 137, in said box formation 136, to form an air seal. A plate 138, formed upon the said fin-shaped member 135, affords a means for pressing the packing in place.

When the apparatus is in use, the knob 57, on the instrument board is set to the pressure desired and the springs 52, in the control compartment 44, will exert a corresponding pressure against the valve 47. Air will enter from the compressor 39, into the distributor compartment 38, through the inlet tube 40, and will register on the gauge 42. The air in the distributor compartment 38, will pass through the tube connections 36, to the flexible connecting members 34, to the air channel 33, from whence it will enter the air inlet 35, into the air compartment 22, through the valve 24, through the air compartment 21, and flexible connection 28, into the inner tube 13.

When the air pressure in the inner tubes exceeds the pressure which may be indicated by the knob 57, and dial 58, upon the instrument board, a back flow will be created through the valve 25, and into the connecting tubes 36, to the distributor compartment 38, and force the valve seat up to allow the excess pressure to escape through the relief valve 59. This flow of excess air will continue until the pressure is reduced to the desired point, as indicated upon the control knob.

Means, not shown, may be provided to discontinue the compressor operation when same is not required.

I claim:

In an apparatus for controlling air pressure in automobile tires comprising an air compressor, tubular connections between the air compressor and the automobile tires, a pressure relief valve means having a manually adjustable air pressure indicator and a dial disposed in communication with said tubular connections, and annular air channels between the wheels and chassis of the automobile, valve chambers upon the wheels, the said valve chambers having inner and outer air compartments, air inlet valves and air pressure control valves in the valve chambers disposed between the said air inlet and outlet compartments, the said air inlet valves adapted to maintain the desired air pressure in the tires and the said air pressure control valves adapted to release any excessive air pressure from the tires.

ARNOLD L. GAIPTMAN.

REFERENCES CITED

The following references are of record in the file of this patent:

UNITED STATES PATENTS

| Number | Name | Date |
|---|---|---|
| 1,788,699 | Zinsitz | Jan. 13, 1931 |
| 1,994,874 | Sams et al. | Mar. 19, 1935 |
| 2,146,102 | Wiegand | Feb. 7, 1939 |
| 2,168,690 | Uksila | Aug. 8, 1939 |